Jan. 2, 1945. C. E. SORENSEN 2,366,365
SUPERCHARGER
Filed Feb. 9, 1942 4 Sheets-Sheet 2

INVENTOR.
C. E. Sorensen
BY
ATTORNEYS.

Jan. 2, 1945.   C. E. SORENSEN   2,366,365
SUPERCHARGER
Filed Feb. 9, 1942   4 Sheets-Sheet 3

INVENTOR.
C. E. Sorensen
BY E. C. McRae and
Robert H. Harris
ATTORNEYS.

Jan. 2, 1945.                 C. E. SORENSEN                 2,366,365
                                SUPERCHARGER
                            Filed Feb. 9, 1942                4 Sheets-Sheet 4

C. E. Sorensen
INVENTOR.

BY
Attorneys.

Patented Jan. 2, 1945

2,366,365

UNITED STATES PATENT OFFICE 2,366,365

SUPERCHARGER

Charles E. Sorensen, Detroit, Mich., assignor to Ford Motor Company, Dearborn, Mich., a corporation of Delaware Application February 9, 1942, Serial No. 430,119

11 Claims. (Cl. 60—35.6)

This invention relates to aircraft power plant construction and is particularly directed to an improved arrangement of the engine, a turbo-supercharger assembly and a fuselage.

Present requirements of both military and commercial aviation require the use of some form of supercharger with all but the smallest types of engines. To meet this need, various classes of superchargers have been developed, notably, centrifugal fans gear-driven from the engine, displacement blowers similarly driven, and centrifugal fans driven by a turbine utilizing the exhaust from the engine. The present invention is directed to the latter class, and particularly as applied to a liquid-cooled engine.

Although the invention, as shown, is applied to an erect V type engine of this class, it is, in many respects, applicable to other engine conformations as the inverted V, H, and the like.

It is therefore an object of this invention to provide a novel aircraft engine and supercharger arrangement. A further object is to so locate and integrate the supercharger assembly with the motor so that both may be treated as a single unit for purposes of handling and maintenance, yet without obtaining unwanted heat transfer. Yet another object is to so arrange these components that the frontal area of the engine is maintained at a minimum in the interest of streamlining. Also, the intake and exhaust manifolding necessary for the operation of the engine is so arranged that there is a minimum of interference with the aerodynamic qualities of the fuselage. Another object is to obtain superior intake conditions as well as to increase the efficiency of intercooler performance.

Further objects and other novel and advantageous features, which are applicable to such engines in general, will be pointed out more specifically in the description which follows:

With these and other objects in view, the invention consists in the arrangement, construction and combination of the various parts of the improved device, as described in this specification, claimed in the claims and illustrated in the accompanying drawings, in which:

Figure 1:
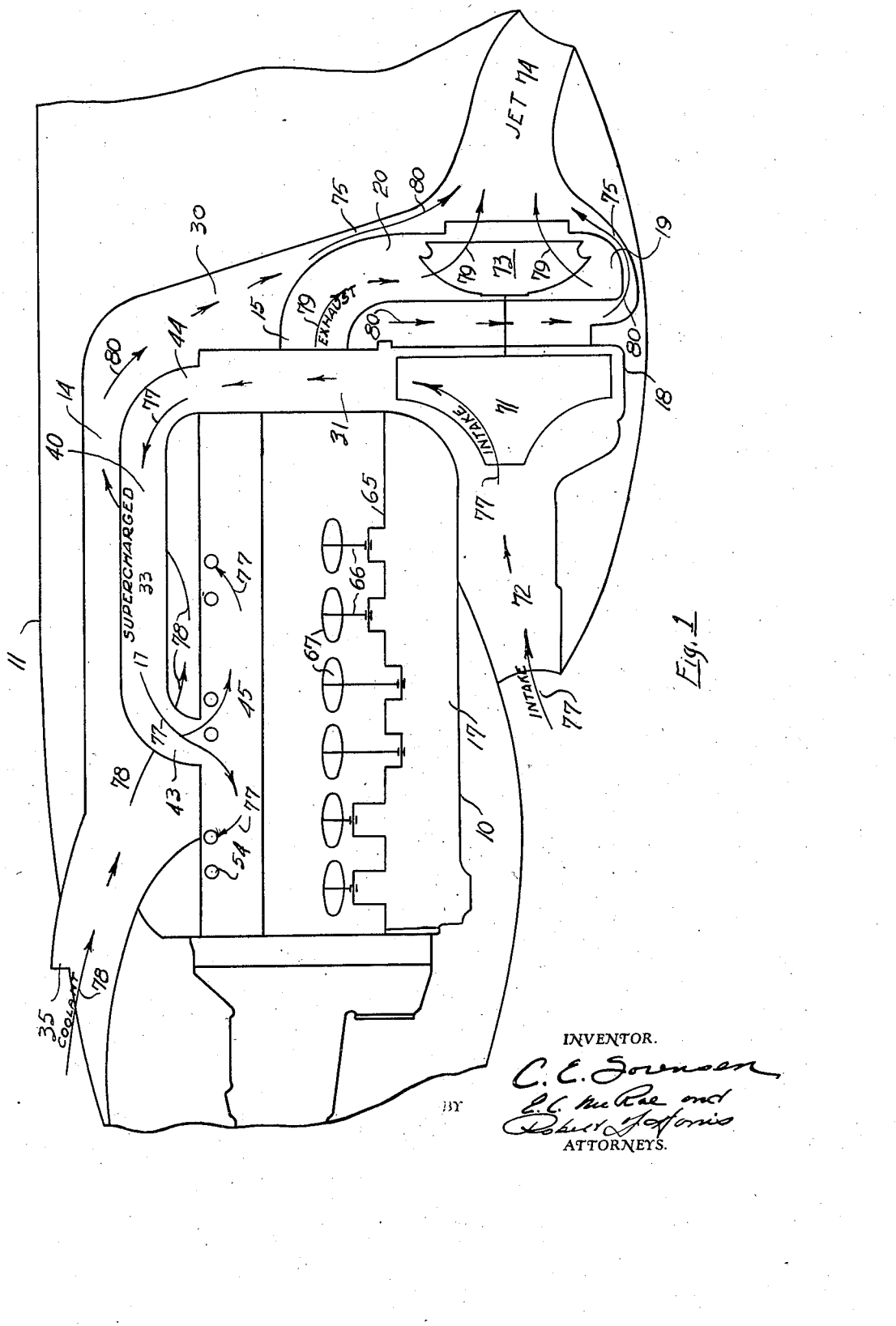
Figure 1 is a diagrammatic elevation of the engine and supercharger combination of this invention and the associated fuselage or nacelle.

Referring first to Figure 1, the general assembly of the engine and supercharger is shown diagrammatically. The engine, generally indicated as 10, is shown in location with respect to the enclosing fuselage or nacelle 11 of an aircraft. The major components of the engine 10 as shown on Figures 1, 3, or 5 include the block 12, the heads 13, the intercooler 14, the exhaust manifold 15, the reduction gear housing 16, and the crankcase 17. Integral with the crankcase 17, or separable therefrom as the exigencies of construction may demand, is the fan housing 18 with which is associated the turbine housing 19 having the down-leads 20 from the exhaust manifold 15.

Figure 3:
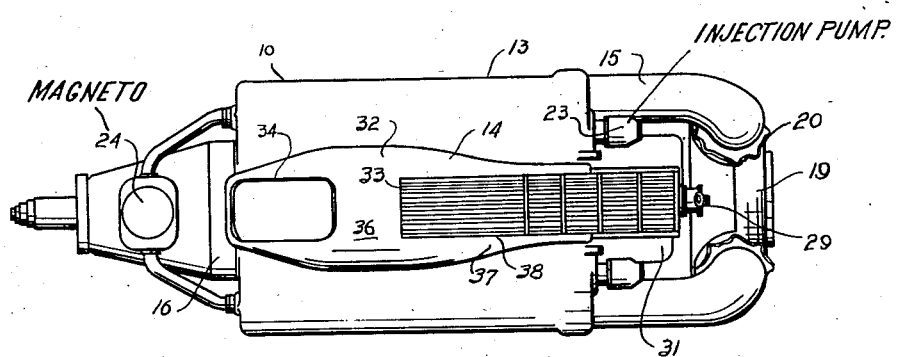
Figure 3 is a plan view of the top of the engine.

Associated with the engine and more properly referred to as accessories are the fuel injection pumps 23 and the magneto 24 as shown in Figure 3. The remaining accessories, such as the fuel and oil supply pumps, the hydraulic pumps, etc. (not shown) are preferably mounted in a group and isolated from the motor but are driven in synchronism with the motor by means of the drive 29. This construction is advantageous in that it insures synchronism of related accessories and groups them together where they are easily handled as a unit and protected from motor heat or fire.

Figure 3 also shows how the exhaust manifold 15, the down-leads 20 and the turbine housing 19 elements are kept within the limits of the engine heads 13, reducing the frontal area of the engine. Also shown in this view is the duct 31 leading from the fan housing 18 to the intercooler 14. This view gives a very good idea of the compactness which has been achieved insofar as the frontal area is concerned. This is important not alone from the standpoint of reduction of drag but, as will be pointed out in some detail later, this compactness is achieved by an arrangement which possesses other advantages as well.

Figure 5:
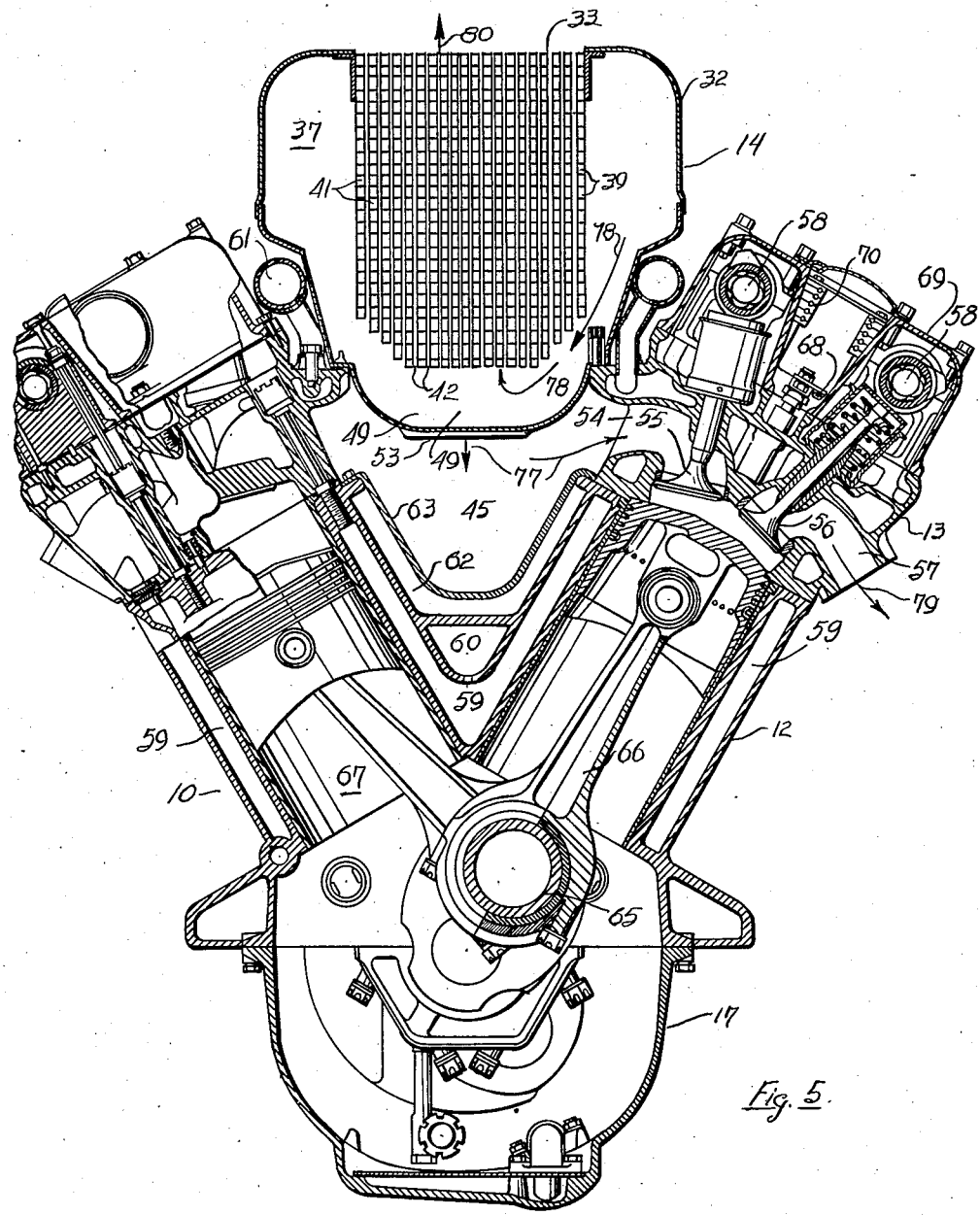
Figure 5 is a transverse section through the engine block on a somewhat larger scale, showing the association therewith of the intercooler.

Reference is now made to Figures 3 and 5, particularly as showing the disposition of the intercooler 14 between the heads 13 of the engine. It will be noted that it comprises a cowling 32 enclosing a core 33. The cowling 32 has a port 34 at its front end which is in communication with the intercooler air scoop 35, indicated on Figure 1 and flares outwardly therefrom forming an enlarged central diffusion portion 36 which extends along the core 33 for a part of its length and is gradually reduced in area serving as an entry duct 37 admitting air to the underside of the core 33. The greater part of the top 38 is open permitting the exhaust of cooling air to the intercooler exhaust 30.

Figure 2:
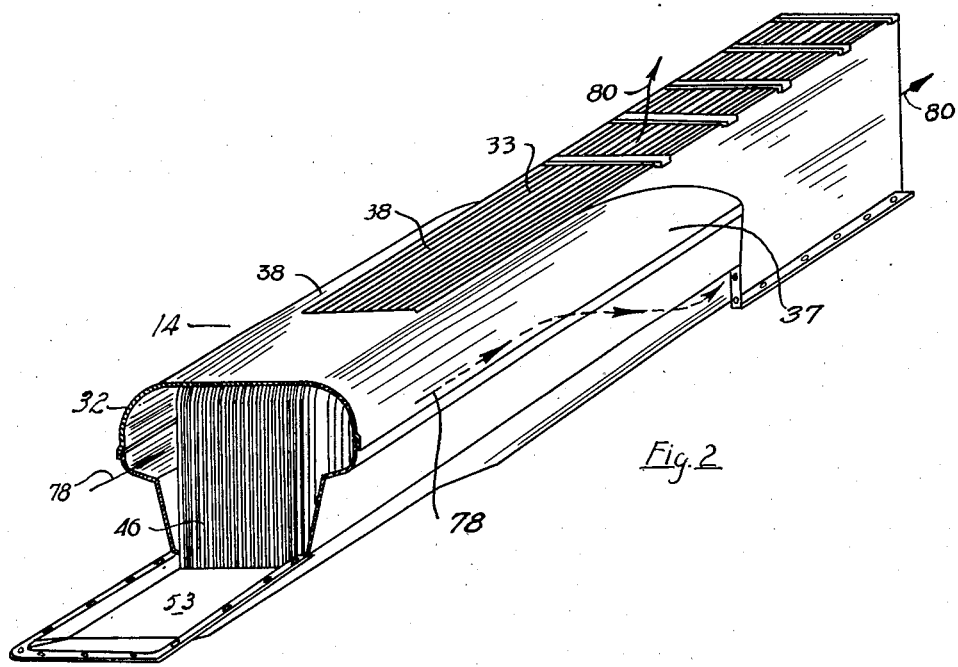
Figure 2 is a perspective view of the intercooler element used with the engine.
Figure 4:
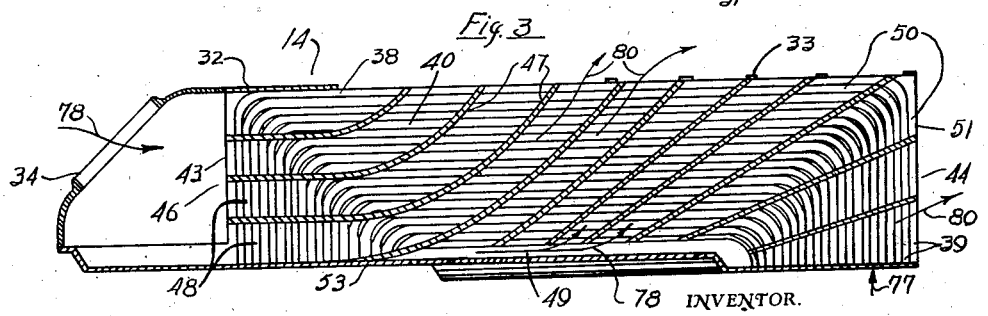
Figure 4 is a longitudinal section of the intercooler as shown in Figure 2 and on a somewhat reduced scale therefrom.

The intercooler construction as shown in Figures 2, 4, and 5 is, in many respects, novel. The core 33 is composed of a number of thin metal tubes 39 of rectangular cross section. As shown in Figure 5, a number of individual tubes 39 are stacked together to form a vertical bank 41, the upper and lower surfaces of the vertically adjacent tubes being in contact and a number of the banks being spaced laterally to provide air passageways 42 between each pair of banks 41. The tubes 39 are each bent through approximately 90 degrees near the front and the rear of the core, forming the vertical risers 43 and 44, respectively. The rear riser 44 connects with the duct 31, leading to the supercharger fan, while the front riser 43 connects with the intake reservoir 45 between the V, of the cylinders. Therefore, the air under pressure from the supercharger passes up the duct 31 to the rear riser 44, through the horizontal section 40 and down the front riser 43 into the reservoir 45 from which it is forced into the individual cylinders through intake ports 54. The purpose of the individual tube 39 construction is that the sidewalls provide surfaces for heat transfer to the cooling air; and the tube, as a whole, conducts the supercharged air through its tortuous course without loss due to the formation of eddy currents.

While the supercharged air is flowing through the tubes 39, it is cooled by atmospheric air entering through the intercooler air scoop 35 and the port 34 to the interior of the intercooler cowling 32. The cooling air admitted through the port expands in the diffusion section 36 and separates, a portion of it going directly to the air passageways 42 in the frontal area 46 of the core and the remainder going through the flared entry ducts 37 of the intercooler cowling on each side of the core 33. As shown in Figure 4, a number of strips 47 are inserted in the air passageways 42 between adjacent vertical banks 41 of tubes. These strips perform the dual function of maintaining the banks in proper lateral alignment and of directing the flow of cooling air through the passageways. It will be seen that the air entering the frontal area 46 is divided into four major passageways 48, through which it is directed rearwardly and upwardly and is exhausted through the top opening 38 of the intercooler cowling. The remaining cooling air, which was directed into the entry ducts 37 is forced downwardly and rearwardly by the configuration of the cowling into a well 49 as shown by the dotted arrows 78 in Figure 2 and solid arrows 78 in Figure 5. This well extends underneath the horizontal section 40 of the core and the cooling air is forced upwardly from it through the air passageways 50, exhausting either through the top opening 38 or the rear of the core 51.

The vertical banks 41 differ in depth, as shown in Figure 5, the outer group of banks on each side being cut away to permit an air passage to be maintained between the ducts 37 to the well 49.

As stated above, the cooled air from the intercooler discharges into the intake reservoir 45. This reservoir is formed by closing off the V of the engine by the bottom plate 53 of the intercooler, which is bolted directly to the heads 13 of the engine. The intake ports 54 are arranged adjacent the inner V and lead to the intake valves 55 from the reservoir 45.

The exhaust valves 56 are on the outer V and connect through the ports 57 with the exhaust manifolds 15. Separate camshafts 58 operate each set of valves.

Cooling water is circulated through the engine water jackets 59 by ducts 60 and 61. The intake air in the reservoir 45 is protected from the high temperatures in the cylinder water jacket by a dead-air insulating space 62 formed by the spaced plate 63. The remainder of the engine construction will not be described in further detail except to note that in Figure 1, the crankshaft is 65, 66 the connecting rods, and 67 the cylinder barrels. The engine fuel lines 68, one of which runs to each cylinder, are carried in the camshaft housing 69 as are the ignition wires 70. In the engine shown, individual fuel injection is used, but similar considerations apply when carburetion or mass injection are provided.

Returning to Figures 1, 6 and 7, a centrifugal impeller 71 is shown in the fan housing 18 communicating with the intake air scoop. The impeller is directly driven by the exhaust turbine 73 and forces air into the duct 31. The exhaust gases, after passing through the turbine runner 73, are exhausted to the atmosphere through the nozzle 74. In the present construction, the intercooler cooling air in the intercooler exhaust 30 also flows out through the nozzle 74, cooling the turbine housing 19 en route and giving an ejector effect through the restricted ring orifice 75.

Figure 6:
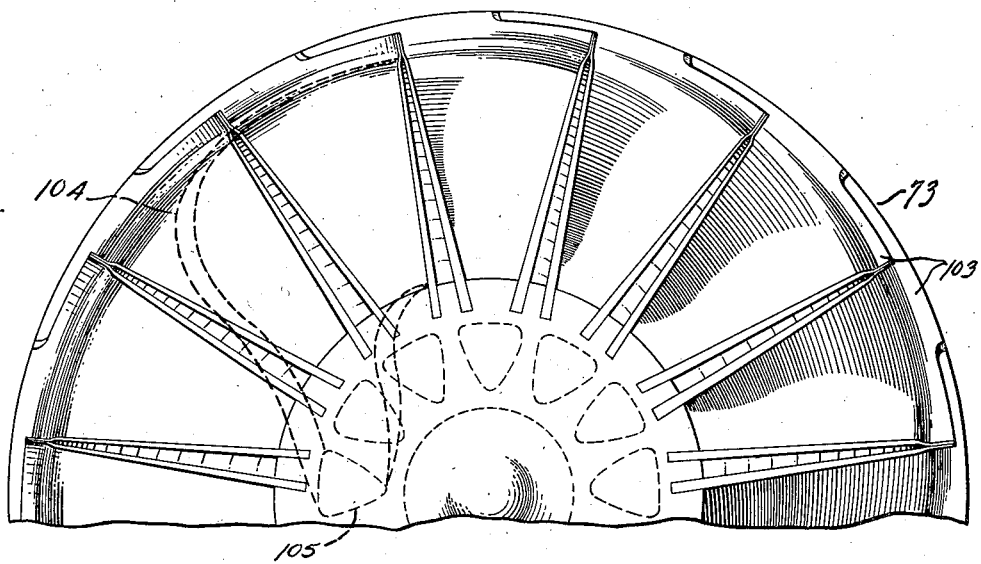
Figure 6 is a partial vertical elevation of the rear face of the exhaust turbine.
Figure 7:
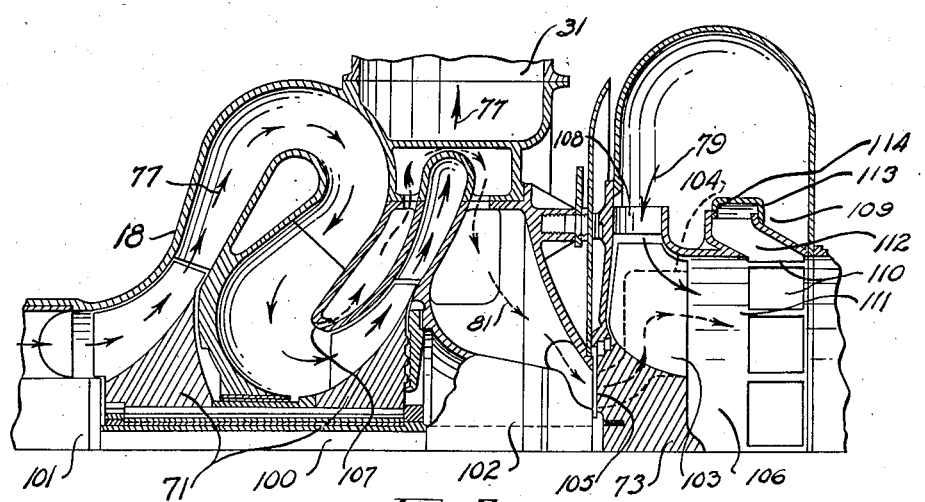
Figure 7 is a partial longitudinal vertical section through the assembled impeller and turbine.

A typical physical embodiment of the impeller turbine combination is described at length in my copending application, Serial No. 430,118 and shown in detail in Figure 6 or 7. Thus the impeller 71 (two stages are usually used) is mounted on the shaft 100 journalled in the bearings 101 and 102 supported by the impeller housing 18 having the turbine runner 73 bolted to the other end. The runner itself is of the axial flow type having a number of radial skew vanes 103 made with a hollow center section 104 (shown in dotted line) leading to ports 105 in the front face of the runner and exhausting at the rear face into the receiving chamber 106. The purpose of this construction is to provide cooling for the blades of the runner as by air withdrawn from the impeller housing 18 as through the bleed 107, passing adjacent the bearing 102 and thence through the ports 105 and the center sections 104. This air then mixes with the turbine exhaust and subsequently it, the exhaust, and the intercooler exhaust flow to the jet 74. The exhaust gases are admitted to the periphery of the runner through the ports 108 from the exhaust 15, that portion of the exhaust not being needed to operate the runner being wasted through a ring valve 109, directly to the chamber 106. The ring valve comprises a series of apertures 110 in the wall 111 of the chamber 106, a continuous channel 112 leading thereto, and a ring 113 having depending flanges 114 adapted in one position to close the channel 112 (as shown in the drawings) and prevent the flow of gas therethrough; or be moved rearwardly of the engine to open the channel and admit proportional amounts of the exhaust gas in the manifold 15 to the channel 112 and thence waste it through the apertures 110 to the chamber 106. The foregoing specific construction of the impeller and turbine is not claimed in this application, but forms a part of the copending application above referred to.

Arrows have been used on Figures 1, 2, 4, and 5 to indicate the various flow courses and are numbered as follows:

Air for combustion—77
 Intercooler cooling air—78
 Engine exhaust—79
 Intercooler exhaust—80
 Runner coolant—81

The advantages which flow from the arrangement described may be grouped under three general heads:

1. Diminution of frontal area
 2. Thermal interchange
 3. Intake efficiencies

The first heading has been commented on before, and its advantages are at once apparent from inspection of the drawings. The utilization of the space between banks for both the intake reservoir and the intercooler contributes to this, as does the placing of the turbosupercharger in the lower rear quadrant. In either case, the included elements are faired within the limits imposed by the air scoops which, at all events, are necessary—and hence represent no additional drag. While not reflected in a physical area, the fact that all intakes and exhausts from the engine enter or leave the fuselage or nacelle longitudinally rather than laterally is in effect a reduction in drag.

The second heading may be further subdivided into the advantages flowing from the physical separation of hot and cold zones, from the "countercurrent" cooling employed throughout, and from the controlled flow velocities through the radiator whereby the cooling effect is increased and the transferred heat utilized.

Thus, careful consideration of the drawings will show that there is a spaced segregation of zones of extreme temperatures, whether these be high or low. Consequently, unwanted heat transfers are prevented without resort to additional insulation. This segregation can be further utiilzed in connection with the several coolant streams, so that maximum thermal exchange efficiencies are obtained through full employment of the countercurrent principle. Finally, the application of duct cooling to an intercooler of the disclosed construction results in a decided decrease in drag due to the small frontal area presented and the unobstructed coolant channels. The graduated increase in sectional area and the equating of this area to the change in volume of the coolant gas further reduces internal drag and improves heat transfer.

The third heading, that of the efficiency of intake conditions, mainly concerns the employment of the reservoir and the means provided for keeping the intake air cool while in the reservoir. By using the large, centrally disposed reservoir, intake manifolding of the type usually used is unnecessary. When the weight of the common tortuous manifold castings is compared with the present structure—merely the plate 63—the saving is at once apparent. But the provision of a central reservoir brings problems of distribution to avoid starving certain of the cylinders, which are automatically controlled in individual manifold circuits. The reservoir must be of adequate size to avoid rarefactions adjacent one cylinder intake as its valve opens, due to previous intake of another cylinder; and it must also be substantially free of any obstructions which tend to hinder air flow to any point in response to pressure changes. Difficulty also arises in keeping the large volume of air required at the proper low temperatures. The temperature of the engine cooling fluid in the adjacent jackets is well above that desired for the air; and, accordingly, there must be some insulation interposed as represented by the dead air space 62 and plate 63. But positive cooling must be provided as well, and this comes from the bottom plate 53 of the intercooler which, as explained above, is in contact with the cool streams of coolant air. The effectiveness of this cooling is further enhanced by having the intake ports 54 adjacent the bottom plate 53 to insure that the air will be drawn into its vicinity. Essentially, the principal requirement is to have an adequate volume of air available, about double the cylinder capacity in the reservoir space apportioned to each pair of cylinders will serve, and there should be no obstruction to flow within the reservoir itself.

Apart from the general flow arrangement and the intake arrangement, the greatest advantages stem from the avoidance of losses in the cooling element, per se. It may be shown that possible heat transfer varies directly as the speed of the air over the surface, while the power expenditure to overcome drag varies as the cube. The drag is attributable to skin friction drag of stream flow, to eddy currents arising from separation of stream from surface, and to expansion losses. It may be reduced by avoiding stream separation or severe expansion, by reducing stream velocity over the cooling surface, and by cutting down on the external surface. Each of these points has been considered in this development.

Each of the points of advantage has been described in some detail with particular reference, it is true, to the specific construction shown in Figures 2 to 5. However, the diagrammatic showing of Figure 1 indicates how the broad inventive ideas involved may be applied to engines of other constructions and with like results. The purely structural details of the figures noted should not, therefore, be construed as limiting the application of the arrangement and the operation of its various components.

Some changes may be made in the arrangement, construction, and combination of the various parts of the improved construction without departing from the spirit of the invention and it is the intention to cover by the claims such changes as may reasonably be included within the scope thereof.

I claim as my invention:

1. In an aircraft power plant, in combination, an engine of the V type, a turbosupercharger associated with said engine on the lower rear quarter thereof, connections from the exhaust ports of said engine to said turbosupercharger, delivery connections from said turbosupercharger to the intake ports of said engine, said delivery connections including a cooling means and a reservoir located in the V of said engine, and means to admit coolant air to said cooling means and to direct said coolant air to cool said reservoir.

2. In an aircraft power plant, in combination, an engine having a plurality of cylinder banks, a turbosupercharger associated with said engine and attached to the rear thereof, connections arranged on the outer side of said cylinder banks from the exhaust ports of said engine to said turbosupercharger, delivery connections from said turbosupercharger to the intake ports of said engine, said delivery connections including a cooling means, said cooling means being located between said cylinder banks, means to admit coolant air to said cooling means, and means in said cooling means to permit the expansion of said coolant by heat transferred thereto in the cooling means while reducing the velocity of coolant flow therethrough.

3. In an aircraft power plant, in combination, an engine having a plurality of cylinder banks, a turbosupercharger associated with said engine and attached to the rear thereof, connections arranged on the outer sides of said cylinder banks from the exhaust ports of said engine to said tubosupercharger, delivery connections from said turbosupercharger to the intake ports of said engine, said delivery connections including an intercooler and a reservoir, said intercooler being arranged between said cylinder banks and defining said reservoir therebeneath, said intake ports communicating with said reservoir, and means to admit coolant air to said intercooler.

4. The structure of claim 3 in which said engine is a V engine, said intercooler being placed between the banks thereof and secured to the upper portion of said banks, the space therebeneath between said V serving as said reservoir, said reservoir being clear and free from impediment to the longitudinal or transverse flow of gas therein, and means associated with said intercooler to direct coolant air to a surface of said intercooler next adjacent said reservoir.

5. In combination, in an internal-combustion engine of the V type, a cooling means comprising spaced banks of tubes arranged substantially longitudinally of said engine and between the banks of said V, said tubes being associated with a plate spanning the space between said V, a cowling for said cooling element, means to introduce coolant air to the frontal area of said cooling means and between said cooling means and said plate, vertically extending spaces between said banks of tubes defining coolant air flow passageways, means in said passageways defining channels directing the coolant flow therein upwardly and rearwardly through said banks, the cross-sectional areas of said channels increasing rearwardly of the core.

6. The structure of claim 5 which is further characterized in that the said cowling increases in cross-sectional area forwardly of the core and rearwardly thereof forms ducts of decreasing cross-sectional area along the sides thereof for a portion of its length, said core being shaped to permit flow of the air from said ducts to the lower side of said core.

7. In combination, in an internal-combustion engine of the V type, an air cooler and an air reservoir, means associated with the cylinder banks of said V and extending therebetween, forming a reservoir therebeneath, said reservoir being free from any impediment to transverse or longitudinal flow of gas therein, said cooler including a core, said core being formed of a plurality of spaced vertical banks of tubes, said tubes extending substantially longitudinally of the engine for the greater part of their length, the forward parts of said tubes traversing said plate and being in communication with the reservoir therebeneath, a cowling associated with said core and said plate, said cowling expanding in cross-sectional area forwardly of said core and extending therealong for a portion of its length forming entry ducts, connection between said cowling and an air scoop for the admission of coolant air, said coolant air being admitted to the spaces between said banks of tubes constituting passageways for said coolant, said coolant air being admitted at the frontal surface of said core and, through said entry ducts, to the underside of said core and said first means and means in said passageways to direct the flow of coolant therein backwardly and upwardly.

8. In an engine and turbosupercharger assembly, an internal-combustion engine of the V type, means bridging the space between the banks thereof, a plurality of transversely spaced banks of air conduits located above said means, said conduits extending substantially longitudinally of said engine, the forward ends of said conduits traversing said means and discharging into the reservoir formed therebeneath, a supercharger, the rearward ends of said conduits connecting with said supercharger, spaces between said banks defining coolant channels, means in said channels defining coolant passageways extending rearwardly and upwardly throughout said cooling means, a cowling enclosing said conduits and extending forwardly thereof, a connection between said cowling and a coolant air scoop, said cowling increasing in cross-sectional area between said scoop and said cooling means, said cowling extending along the side of said banks for a portion of their extent and communicating with the space between said banks and said first-named means.

9. In an aircraft power plant, in combination, an engine of the V type, a centrifugal fan rotatably supported on said engine adjacent to the lower rear end thereof, a turbine drivingly connected to said fan and mounted therebehind, means to conduct exhaust gases from said engine to said turbine, and located on the outer side of said V, an intercooler mounted on top of said engine between the banks thereof, and conducting means from said fan to said intercooler forwardly of said turbine.

10. In an aircraft power plant, in combination, an engine of the V type, a centrifugal fan rotatably supported on said engine adjacent its lower rear end, a turbine drivingly connected to said fan, exhaust manifold on the outer side of each bank of cylinders leading to said turbine, an intercooler positioned in said V and secured to the heads of said cylinders defining a closed chamber therebeneath, means positioned forwardly of said turbine to conduct supercharged air from said fan to said intercooler, means to lead said supercharged and cooled air from said intercooler into said reservoir, and means for cooling said turbine.

11. In an aircraft power plant, in combination, an engine of the V type, a turbosupercharger assembly mounted at the rear and adjacent the lower part of said engine, an exhaust manifold leading from the cylinder of said engine along the outer side of each bank thereof to said turbine, means for cooling the supercharged air positioned between the banks of said V, means forwardly of said turbine to lead supercharged air from said supercharger to said cooling means, a port admitting cooling air to the forward end of said cooling means, and means by which the cooling air exhausted from said cooling means may be directed to said turbine for the cooling thereof.

CHAS. E. SORENSEN.